United States Patent
Cocora et al.

(10) Patent No.: US 8,703,025 B2
(45) Date of Patent: Apr. 22, 2014

(54) METHOD FOR MAKING A COLORED CONTACT LENS

(75) Inventors: Gabriela Cocora, Elsenfeld-Eichelsbach (DE); Axel Heinrich, Aschaffenburg (DE)

(73) Assignee: Novartis AG, Basel (CH)

( * ) Notice: Subject to any disclaimer, the term of this patent is extended or adjusted under 35 U.S.C. 154(b) by 77 days.

(21) Appl. No.: 12/917,695

(22) Filed: Nov. 2, 2010

(65) Prior Publication Data

US 2011/0101552 A1     May 5, 2011

Related U.S. Application Data

(60) Provisional application No. 61/257,956, filed on Nov. 4, 2009.

(51) Int. Cl.
    *B29D 11/00*     (2006.01)

(52) U.S. Cl.
    USPC .......................................................... 264/2.7

(58) Field of Classification Search
    USPC .......................................................... 264/2.7
    See application file for complete search history.

(56) References Cited

U.S. PATENT DOCUMENTS

| | | | |
|---|---|---|---|
| 4,761,069 A * | 8/1988 | Truong et al. | 351/160 H |
| 4,955,580 A | 9/1990 | Seden | |
| 5,036,971 A | 8/1991 | Seden | |
| 5,143,660 A | 9/1992 | Hamilton | |
| 5,508,317 A | 4/1996 | Müller | |
| 5,531,940 A * | 7/1996 | Gupta et al. | 264/1.7 |
| 5,573,108 A | 11/1996 | Hamilton | |
| 5,578,332 A | 11/1996 | Hamilton | |
| 5,583,163 A | 12/1996 | Müller | |
| 5,782,460 A | 7/1998 | Kretzschmar | |
| 5,789,464 A | 8/1998 | Müller | |
| 5,849,810 A | 12/1998 | Müller | |
| 5,894,002 A | 4/1999 | Boneberger | |
| 6,068,464 A | 5/2000 | Su | |
| 6,082,987 A | 7/2000 | Su | |

(Continued)

FOREIGN PATENT DOCUMENTS

| | | | |
|---|---|---|---|
| EP | 0367513 A2 | | 5/1990 |
| JP | 63013721 A | * | 1/1988 |

(Continued)

OTHER PUBLICATIONS

English abstract of JP63013721.*

(Continued)

*Primary Examiner* — Larry Thrower
*Assistant Examiner* — Xue Liu
(74) *Attorney, Agent, or Firm* — Sheng-Hsin Hu

(57) ABSTRACT

The present invention relates to a method for the manufacture of a contact lens with a printed image thereon, in particular a silicone hydrogel contact lens with a printed image thereon, comprising applying one or more ink drops to at least a portion of at least one molding surface of a lens mold, wherein each ink drop is sufficiently flat, that the forces exerted by the mold surface to the ink drop surface in the area where they make contact, are higher than the forces exerted by the flowing lens forming material to the facing surface of the ink drop, and wherein the ink material and the lens forming material are sufficiently immiscible or not miscible at all.

11 Claims, 3 Drawing Sheets

(56) References Cited

U.S. PATENT DOCUMENTS

| | | |
|---|---|---|
| 6,099,763 A | 8/2000 | Su |
| 6,315,410 B1 | 11/2001 | Doshi |
| 6,365,074 B1 | 4/2002 | Su |
| 6,407,145 B1 | 6/2002 | Müller |
| 6,800,225 B1 | 10/2004 | Hagmann |
| 6,834,955 B2 | 12/2004 | Doshi |
| 6,880,932 B2 | 4/2005 | Doshi |
| 6,955,832 B2 | 10/2005 | Quinn |
| 7,048,375 B2 | 5/2006 | Doshi |
| 7,255,438 B2 | 8/2007 | Atkins |
| 7,267,846 B2 | 9/2007 | Doshi |
| 7,549,742 B2 | 6/2009 | Doshi |
| 7,550,519 B2 | 6/2009 | Phelan |
| 7,638,075 B2 | 12/2009 | Quinn |
| 2002/0030788 A1 | 3/2002 | Doshi |
| 2002/0039172 A1 | 4/2002 | Ocampo |
| 2003/0054109 A1 | 3/2003 | Quinn |
| 2003/0071964 A1 | 4/2003 | Doshi |
| 2004/0130676 A1 | 7/2004 | Doshi |
| 2004/0222539 A1 | 11/2004 | Hagmann |
| 2005/0168688 A1 | 8/2005 | Doshi |
| 2005/0221105 A1 | 10/2005 | Quinn |
| 2005/0237483 A1 | 10/2005 | Phelan |
| 2005/0272833 A1 | 12/2005 | Doshi |
| 2006/0077341 A1 | 4/2006 | Atkins |
| 2008/0143003 A1* | 6/2008 | Phelan ........................ 264/1.36 |
| 2009/0252868 A1 | 10/2009 | Phelan |

FOREIGN PATENT DOCUMENTS

| | | |
|---|---|---|
| WO | 8704390 A1 | 7/1987 |
| WO | 0124994 A1 | 4/2001 |
| WO | 0140846 A2 | 6/2001 |
| WO | 0196934 A2 | 12/2001 |
| WO | 02074186 A2 | 9/2002 |
| WO | 2005102675 A2 | 11/2005 |

OTHER PUBLICATIONS

English abstract of JP63013721, 1988.*

PCT Invitation to Pay Additional Fees dated Feb. 14, 2011, International Application No. PCT/EP2010/066582, International Filing Date Nov. 2, 2010.

* cited by examiner

METHOD FOR MAKING A COLORED CONTACT LENS

This application claims the benefit under 35 U.S.C. §119 (e) of U.S. provisional application Ser. No. 61/257,956 filed on Nov. 4, 2009, herein incorporated by reference in its entirety.

The present invention relates to a method for the manufacture of a contact lens with a printed image thereon, in particular a silicone hydrogel contact lens with a printed image thereon, comprising applying one or more ink drops to at least a portion of at least one molding surface of a lens mold, wherein each ink drop is sufficiently flat, that the forces exerted by the mold surface to the ink drop surface in the area where they make contact, are higher than the forces exerted by the flowing lens forming material to the facing surface of the ink drop, and wherein the ink material and the lens forming material are sufficiently immiscible or not miscible at all.

BACKGROUND OF THE INVENTION

Ophthalmic lenses, in particular contact lenses, more particular silicone hydrogel contact lenses, which are intended to be produced economically in large numbers, are preferably produced by the so-called mold or full-mold process. In this process, the lenses are produced in their final shape between two mold halves, so that neither subsequent machining of the surfaces of the lenses nor machining of the edge is necessary. Mold processes are described, for example in WO-A-87/04390, EP-A-0367513 or in U.S. Pat. No. 5,894,002.

In order to produce a contact lens, usually a specific amount of a flowable lens forming material is introduced into the female mold half in a first step. The mold is then closed by putting the male mold half into place. The subsequent polymerization and/or cross-linking of the lens forming material is carried out by means of irradiation with UV light and/or by heating. After the lens if formed, the mold is disassembled and the lens removed. Additional processing steps, such as inspection, extraction, hydration, surface treatment and sterilization may finally be performed on the lens before packaging.

Contact lenses having one or more colorants on the lens for cosmetic purposes are in high demand. These colored contact lenses may enhance the natural beauty of the eye and/or may provide unique patterns on the iris of the wearer. Further, non cosmetic patterns or marks, such as rotation marks, inversion marks, product codes and/or lot numbers may be present on the contact lenses, which are of benefit to wearers, eye-care practitioners and manufacturers. These marks are generally referred to as identification marks.

Ophthalmic lenses, in particular contact lenses use a well-defined geometrical configuration which determines their optical properties. The shape of each lens is characterized by three attributes: (1) the curvature of its two surfaces; (2) the thickness at its center and edges; and (3) its diameter. The two surfaces of a lens can use various geometric configurations, including the following shapes: spherical; cylindrical; toric; plano; aspheric (usually elliptical); and progressive.

For example, the surface of a lens can have a constant radius along its different axes so that the surface is symmetrical, which is known as a spherical surface. The spherical lens surface mirrors the shape of a portion of a sphere in which all meridians have the same radius of curvature. The spherical surface may be either convex or concave.

Alternatively, the surface of the lens can have two axes, each having a different radius of curvature, so that the surface of the lens is asymmetrical. An astigmatic surface is an example of such an asymmetrical surface and is characterized by its two principal meridians having a different radius of curvature from each other. The meridian having the greatest radius of curvature is called the "axis", and the other meridian having the smaller radius is called the "perpendicular axis". Astigmatic lens surfaces predominantly include a cylindrical surface and a toric surface. A plano surface and aspheric surface are examples of other lens surfaces used in the art.

For the cylindrical surface, the principal meridians along the axis have an infinite radius of curvature, e. g., flat or straight, and the perpendicular axis has a radius of curvature which is the same as the circular radius of a cylinder. Thus, a concave cylindrical surface is shaped to complementarily receive a cylinder on the surface and a convex surface resembles the exterior surface of such a cylinder.

The toric surface resembles the lateral surface of a torus, e. g., shaped as the inner tube of a tire. Thus, a torus surface is similar to a cylindrical surface, but the longitudinal axis curves instead of being straight as for a cylindrical surface. The perpendicular axis or meridian on the toric surface has a radius of curvature smaller than the radius of the axis. As with a spherical and a cylindrical surface, a toric surface can be convex by having the shape of the exterior surface of a torus or, alternatively, may be concave by having the shape of the inner surface of a torus.

An astigmatic surface is used for a person with an ocular astigmatism, in which the cornea is elliptical instead of round. The orientation of the elongated portion of an astigmatic cornea varies from person to person. For example, one person may have an axis at five degrees, another at thirty degrees, and another at yet a different orientation.

The axis of the surface of the lens must be oriented to align with the orientation of the elongated portion of the cornea.

Different lens surfaces can be used in combination. Often, the front surface of a lens is spherical and the back surface is spherical, cylindrical, or toric. The front surface can alternatively be a plano surface. The optimum combination of surfaces in a lens is determined by the optical properties, the proposed use, and the appearance of the lens.

In sum, each ophthalmic lens has a unique set of specifications identifying its optical properties. Because a lens formed by molding takes the shape of the molds, the specifications of the lens are determined by the corresponding specifications of the mold, i.e. the two mold halves, as well as by the relative position of the mold halves.

If only lenses with one set of specifications are produced in a particular manufacturing process comprising all the steps from mold to package, there is no need for individual marking of each lens with its set of specifications (e.g. by using an identification mark).

In an automated lens-forming manufacturing process however, usually more than one set of specifications can be produced on one manufacturing line and/or more than one manufacturing line can be utilized to produce lenses in quantity. Often one manufacturing line may produce lenses with one set of specifications. Other lines may produce lenses with another set of specifications.

Generally, lenses with one set of specifications produced on a specific manufacturing line within a defined period of time are called a lot. Usually, each lot is giving a number and said lot number is labeled on all packages of said lot, together with said set of specifications of said lenses.

As each lens has its own set of specifications, at least its package, but preferably the lens itself, must be properly labeled with corresponding specifications before it is delivered to customers. Tracking the specifications of an individual molded lens after its manufacture and verifying its identity is troublesome.

For inventory control of molded lenses an identification mark may be provided on each individual molded lens. The identification mark may include information identifying the lens' optical properties, for example the power of the lens, as well as rotation marks, inversion marks, product codes and/or lot numbers. The identification mark may be visible and readable to human eyes. Preferably, the identification mark is machine readable.

Various methods have been disclosed for bringing cosmetic or non-cosmetic patterns or marks, such as the above described identification marks, onto contact lenses. Said methods include for example printing directly onto the contact lens or printing onto the molding surface of a mold that is then used to make the contact lens.

WO-A-01/24994 discloses a method for labeling an identification mark on a lens for inventory control. The identification mark is placed onto the facing inside surface of a mold by an ink jet printer and is remained there when the lens-forming liquid is cured. Once the lens is formed, but before the demolding of the lens, the identification mark is transferred from the mold to the lens.

WO-A-02/074186 discloses a method for making a colored hydrophilic contact lens, comprising the steps of: coating at least a portion of at least one lens-forming surface of a lens mold with a color coat comprising at least one colorant, and a binder polymer; adding a lens forming composition to the lens mold while maintaining the color coat in position; curing the lens-forming composition to form a coated lens; and subjecting the coated lens to conditions which cause the color coat to adhere to the lens.

WO-A-2005/102675 discloses a method for making a colored silicone hydrogel contact lens, comprising the steps of: (a) applying a color coat to at least a portion of at least one of molding surfaces of a lens mold with an ink comprising at least one colorant and a photo-curable or thermo-curable binder polymer, wherein the mold has a lens-forming cavity between the molding surfaces, wherein the colored coat contains a first surface exposed to the interior of the lens-forming cavity and a second surface in contact with the molding surface; (b) dispensing a lens-forming material into the lens-forming cavity of the mold while maintaining substantially the color coat in position; (c) curing the lens-forming material within the lens-forming cavity to form the contact lens, whereby the colored coat detaches from the molding surface and becomes integral with the body of the contact lens.

An ink can generally be applied to a contact lens or a molding surface of a mold according to any suitable printing technology, such as, for example, pad transfer printing or ink jet printing. It is understood that other types of printing technologies could also be used to print on a lens or to print on a mold.

For ink jet applications, the ink usually has one or more of the following characteristics: a viscosity lower than 50 m Pa·s, preferably lower than 15 m Pa·s; most preferably below 15 m Pa·s; a surface tension of from 20 mN/m to 60 mN/m; a particle size of less than 5 µm, preferably lower than 1 µm; most preferably below 0.5 µm; prolonged stability (i.e., stable for at least 4 hours, preferably at least 8 hours, more preferably at least 24 hours); an appropriate color level (i.e. visible by eye); uniform drop formation and jet stability; good adhesion to contact lenses; good transfer from a mold to a contact lens made in the mold; and stability of the ink in the ink jet nozzles (i.e. minimal drying or crusting effects).

The methods of the prior art however usually have the disadvantage, that an ink drop applied through pad transfer printing, but in particular applied through ink jet printing, usually is moved from its original position on the surface of the mold half and/or is deformed in its original position through the forces exerted by the flowing lens forming material upon closing of the mold. Accordingly, prior art methods either suggest to print directly onto the formed lens or suggest pre-curing the printed ink in the mold before adding the lens forming material. Said methods however add complexity to the process and increase the manufacturing costs.

Accordingly, there is a need to provide an improved method allowing for an industrial scale manufacturing process of molded articles with limited complexity (i.e. less handling steps) and at low cost.

It is an object of the present invention to provide an improved method for making a colored contact lens, in particular for making a contact lens comprising an identification mark on the lens.

SUMMARY OF THE INVENTION

These objects are achieved by a method according to the independent claims. Further embodiments of the method according to the invention are defined in the respective dependent claims.

DEFINITIONS

A lens mold is a part of a mold assembly for forming an ophthalmic lens, in particular a contact lens, preferably in the so-called mold or full-mold process, and preferably comprises two mold halves.

A mold half is a part of a mold assembly for forming an ophthalmic lens, in particular a contact lens, preferably in the so-called mold or full-mold process. The mold half comprises at least a body part as well a lens forming area, wherein in general the lens forming area (or molding surface) for a male mold half has a convex shape and the lens forming area (or molding surface) for a female mold half has a concave shape. When assembled to a mold assembly (or lens mold), the mold halves form a lens shaped mold cavity (i.e. a lens forming cavity) between the male and female lens forming area.

A lens forming material is a polymerizable monomer or macromer composition which can be cured thermally or actinically to obtain a crosslinked polymer and is either hydrophilic or hydrophobic.

A water-based lens forming material, generally a hydrogel material, contains at least one hydrophilic monomer in the presence of or in the absence of additional monomers and/or macromers and is soluble in water.

A solvent-based lens forming material, generally a silicon hydrogel, contains at least one silicone-containing monomer or at least one silicone-containing macromer and is not soluble in water.

An ink is either water-based or solvent-based and comprises at least one colorant or pigment. An ink preferably further comprises a binder polymer, which is a crosslinkable polymer that can be cured thermally or actinically to trap or bind pigments or colorants in a polymer network onto or into a contact lens.

A water-based ink is preferably based on water or another liquid which is capable of hydrogen bonding and therefore soluble in water. A drop of such an ink, which has a volume of preferably less than 100 picoliter, most preferably less than 80 picoliter is applied to the glass surface of a female mold by means of an inkjet printer is not being dissolved (it doesn't bleed) or moved from its position, when silicon-containing lens material, which is solvent-based is dispensed inside the female mold and the mold halves are closed to form the lens. In contrast a drop of such an ink with a volume of preferably less than 100 picoliter, most preferably less than 80 picoliter is being dissolved and bleeds, when a water-based lens-forming material, e.g. a hydrogel is dosed inside the mold and the lens is formed.

A solvent-based ink is preferably an ink that is based on a silicone-containing monomer or a silicone-containing macromer and is soluble in a solvent. A drop of such an ink, which has a volume of preferably less than 100 picoliter, most preferably less than 80 picoliter is applied to the glass surface of a female mold by means of an inkjet printer is not being dissolved (it doesn't bleed) or moved from its position, when a water-based lens material, e.g. a hydrogel is dispensed inside the female mold and the mold halves are closed to form the lens. In contrast a drop of such an ink with a volume of preferably less than 100 picoliter, most preferably less than 80 picoliter is being dissolved and bleeds, when a silicone-containing solvent-based lens-forming material is dosed inside the mold and the lens is formed.

The term "the ink material and the lens forming material are sufficiently immiscible or not miscible at all" refers to that the lens forming material flows around the ink drop without deforming the ink drop in its original position. For example, an ink drop would not be moved from its original position on the molding surface of the mold half and/or that an ink drop is deformed in its original position through the forces exerted by the flowing lens forming material upon closing of the mold, if the ink is based on a waterbased monomer or macromer and the lens forming material is a silicone-containing monomer or at least one silicone-containing macromer and is not soluble in water. For another example, an ink drop would not be moved from its original position on the molding surface of the mold half and/or that an ink drop is deformed in its original position through the forces exerted by the flowing lens forming material upon closing of the mold, if the ink is based on a waterbased monomer or macromer and the lens forming material is a silicone-containing monomer or at least one silicone-containing macromer and is not soluble in water. For a further example, the movement of the ink drop from its original position is dependent on the "flatness" of the ink drop, i.e. the height of the ink drop resting on the molding surface. If said height is sufficiently small (i.e. the ink drop is sufficiently flat), the facing surface of the ink drop towards the lens forming material is small enough, so that the forces exerted by the flowing lens forming material upon closing of the mold are not strong enough to compensate the adhesive forces between the lens mold and the ink drop, which are exerted in the area where the two surface make contact. In addition, it is believed that the deformation (or blurring) of the ink drop in its original position is dependent on the solubility, of the ink material and the lens forming material.

Figure 1:
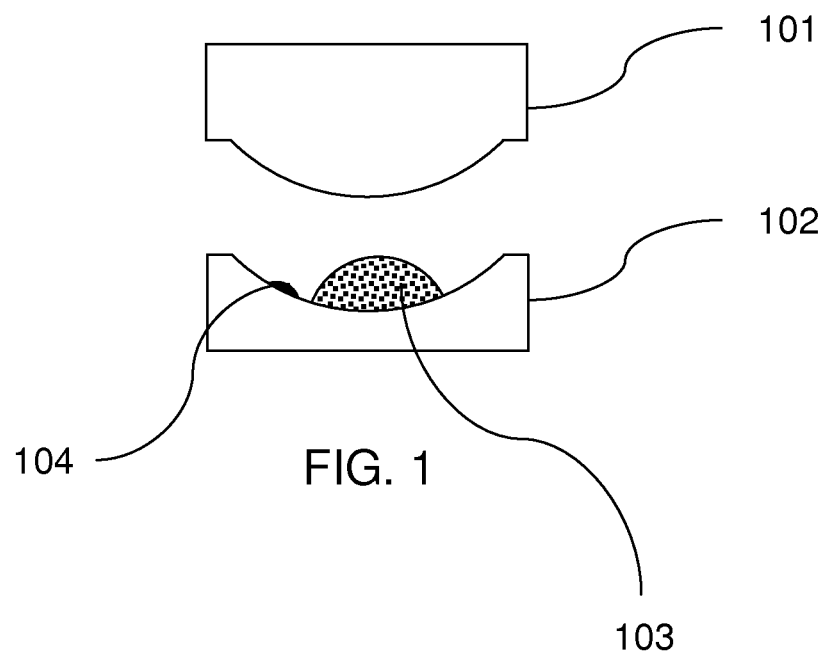
FIG. 1 is a schematic representation (in a side view) of an open mold assembly with a lens forming material and an ink drop.

Surprisingly it has been found, that the careful selection and combination of physical and chemical properties of the respective ink drop relative to the lens mold and relative to the lens forming material can avoid that an ink drop is moved from its original position on the molding surface of the mold half and/or that an ink drop is deformed in its original position through the forces exerted by the flowing lens forming material upon closing of the mold.

It is believed that an ink drop would not be moved from its original position on the molding surface of the mold half and/or that an ink drop is deformed in its original position through the forces exerted by the flowing lens forming material upon closing of the mold, if the ink is based on a silicone-containing monomer or macromer and the lens forming material is waterbased.

It is believed that an ink drop would not be moved from its original position on the molding surface of the mold half and/or that an ink drop is deformed in its original position through the forces exerted by the flowing lens forming material upon closing of the mold, if the ink is based on a water-based monomer or macromer and the lens forming material is a silicone-containing monomer or at least one silicone-containing macromer and is not soluble in water.

Moreover, it is believed that the movement of the ink drop from its original position is dependent on the "flatness" of the ink drop, i.e. the height of the ink drop resting on the molding surface. If said height is sufficiently small (i.e. the ink drop is sufficiently flat), the facing surface of the ink drop towards the lens forming material is small enough, so that the forces exerted by the flowing lens forming material upon closing of the mold are not strong enough to compensate the adhesive forces between the lens mold and the ink drop, which are exerted in the area where the two surface make contact. In addition, it is believed that the deformation (or blurring) of the ink drop in its original position is dependent on the solubility, of the ink material and the lens forming material. If said materials are sufficiently immiscible or not miscible at all, the lens forming material flows around the ink drop without deforming the ink drop in its original position. Preferably the lens forming material is water-based and the ink material is containing a solvent-based lens forming material. However an embodiment, wherein the lens forming material is solvent-based and the ink material is water-based is conceivable as well.

The present invention therefore is directed to a method for making a colored contact lens, comprising the steps of:
(a) applying an ink to at least a portion of at least one molding surface of a lens mold,
(b) dispensing a lens-forming material into one of the mold halves of said lens mold;
(c) closing the two mold halves of the said lens mold to form a lens-forming cavity; and
(d) curing the lens-forming material within the lens-forming cavity to form the contact lens, whereby the ink is transferred to the body of the contact lens.

In the method of the present invention the ink is applied as one or more ink drops, wherein each ink drop has a volume of preferably less than 100 picoliter, most preferably less than 80 picoliter and is sufficiently flat, that the forces exerted by the mold surface to the ink drop surface in the area where they make contact, are higher than the forces exerted by the flowing lens forming material to the facing surface of the ink drop; and, wherein the ink material and the lens forming material are sufficiently immiscible or are not miscible at all.

The method of the invention provides for a printed image, in particular a printed identification mark, which is formed by stable ink drops. Accordingly, the image, in particular a printed identification mark, is neither moved from its original position nor deformed (or blurred).

DETAILED DESCRIPTION OF EMBODIMENTS

Figure 2:
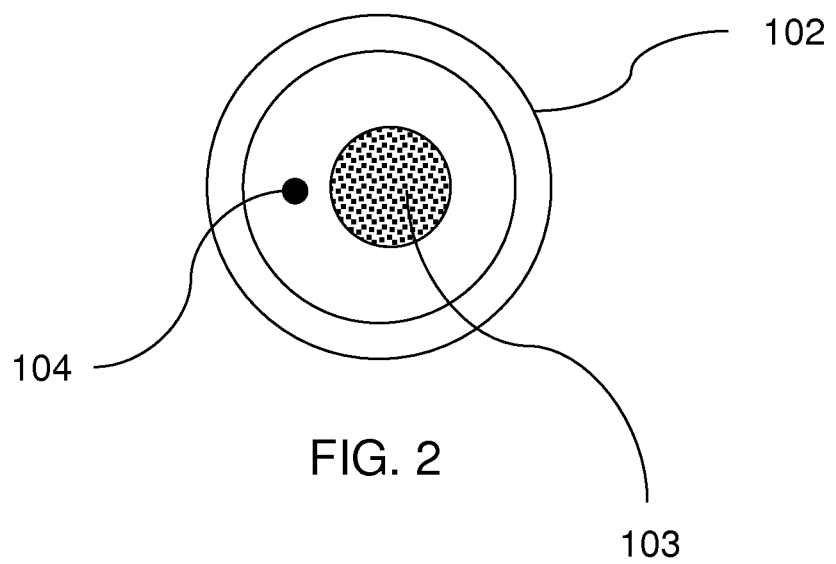
FIG. 2 is a schematic representation (in a top view) of an open mold assembly of FIG. 1 with a lens forming material and an ink drop.

FIG. 1 is showing an embodiment of the invention in a side view. FIG. 1 is showing a male mold half 101 and a female mold half 102 of an open mold assembly, wherein a lens forming material 103 and an ink drop 104 have been placed. FIG. 2 is schematically showing the same situation from a top view, i.e. looking at the surface of the female mold half 102.

Figure 3:
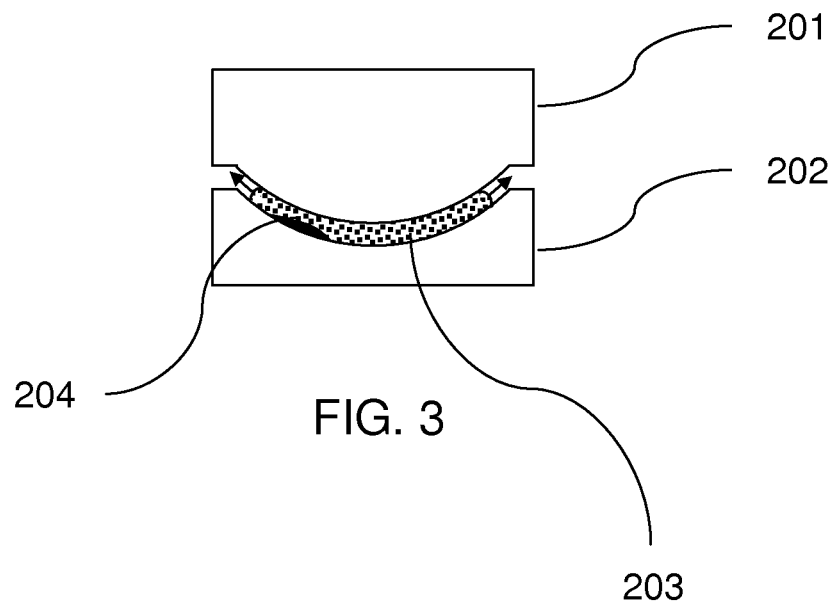
FIG. 3 is a schematic representation (in a side view) of a closed mold assembly with a lens forming material and a blurred ink drop.
Figure 4:
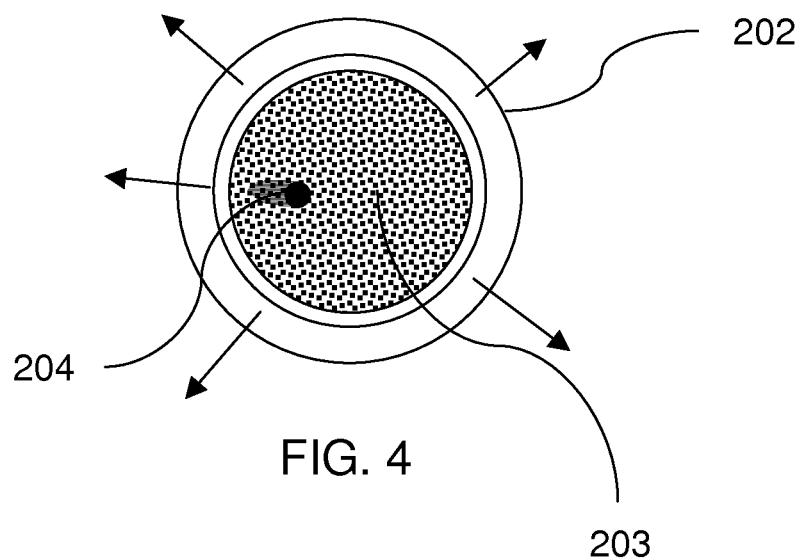
FIG. 4 is a schematic representation (in a top view) of a closed mold assembly of FIG. 3 with a lens forming material and a blurred ink drop.

FIG. 3 is showing an embodiment of the prior art in a side view. FIG. 3 is showing a male mold half 201 and a female mold half 202 of a closed mold assembly or a mold assembly in the process of closing. The arrows are indicating the flow direction of the lens forming material 203 in the lens forming cavity between the two mold halves. The drawing further shows a blurred ink drop 204 which has been blurred by the flow movement of the lens forming material. FIG. 4 is schematically showing the same situation from a top view, i.e. looking at the surface of the female mold half 202. As can be seen, the shape of the ink drop 204 is misshaped into the direction of the flowing lens forming material.

Figure 5:
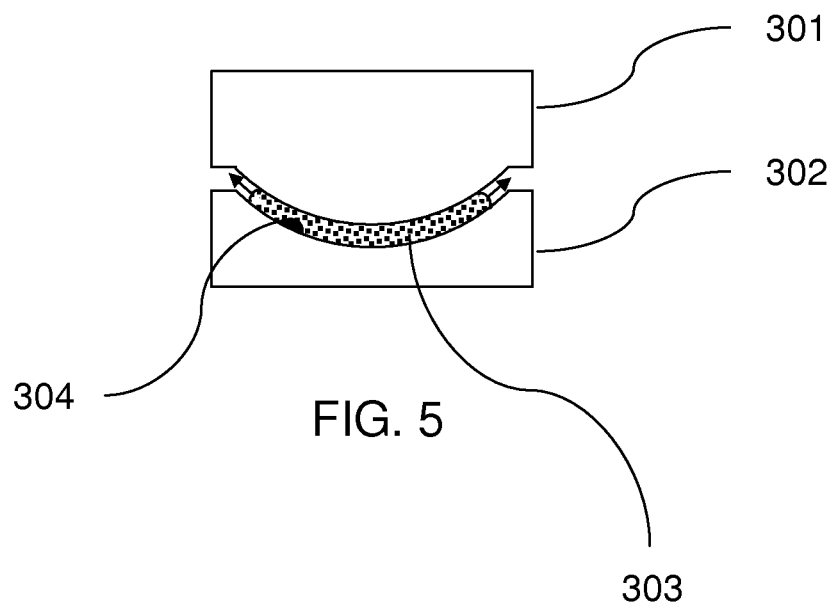
FIG. 5 is a schematic representation (in a side view) of a closed mold assembly with a lens forming material and a stable ink drop.

FIG. 5 is again showing an embodiment of the invention in a side view. FIG. 5 is corresponding to the embodiment of FIG. 1 above, and is showing the situation after or during closing of the two mold halves 101 and 102.

Figure 6:
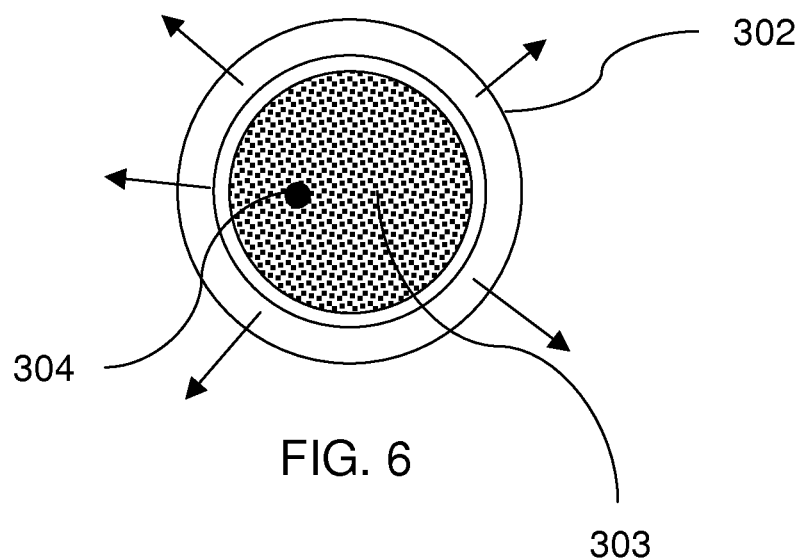
FIG. 6 is a schematic representation (in a top view) of a closed mold assembly of FIG. 5 with a lens forming material and a stable ink drop.

FIG. 5 is showing, in a side view, a male mold half 301 and a female mold half 302 of a closed mold assembly or a mold assembly in the process of closing. The arrows are indicating the flow direction of the lens forming material 303 in the lens forming cavity between the two mold halves. The drawing further shows a stable ink drop 304, which has not been affected by the flow movement of the lens forming material. FIG. 6 is schematically showing the same situation from a top view, i.e. looking at the surface of the female mold half 302, and is corresponding to FIG. 2 above. As can be seen, the shape of the ink drop 304 is stable and the ink drop is maintained in the position it has originally been placed at.

In one preferred embodiment the method of the present invention is practiced by placing an identification mark in ink (i.e. a matrix of several ink drops) on the facing inside surface of a mold. The mold is then filled with a lens-forming material. The lens-forming material is cured or hardened to form the lens while the identification mark is remained on the mold. The identification mark is either transferred from the mold to a portion of the surfaces of the formed lens by virtue of direct contact between the mold and the surfaces of the lens because the ink has stronger affinity to the lens material than to the mold, or the identification mark is transferred from the mold to a portion of the surfaces of the formed lens by cross-linking the ink material with the lens forming material upon curing, wherein the latter method is preferred. Finally, when the lens is removed from the mold, the identification mark stays with that portion of the surfaces of the lens and can be used to identify the lens.

Thus, the identification mark of the lens is given to and labeled directly onto the lens when the lens is produced, or "born". Consequently, the present invention may minimize the likelihood of potential mix-ups. Moreover, an additional inspection procedure to identify the characteristics of the lens is no longer needed. A simple reading of the identification mark can provide information identifying the lens' properties including the power of the lens.

The present invention can be practiced by placing the identification mark on the facing inside surface of the female mold half or the male mold half or both. In a more preferred embodiment, the female mold half is chosen to receive the identification mark.

In a particularly preferred embodiment, the present invention uses an ink jet printer to place the identification mark onto the molding surface. The ink composition is selected to allow the identification mark to remain on the molding surface when the lens forming material is filled and then cured. If the mold is made from glass and the lens forming material is a lens forming silicone hydrogel material (i.e. a solvent-based lens forming material), the ink is selected to be not soluble by the lens forming silicone hydrogel material, i.e. the ink is selected to be based on water (i.e. a hydrogel). In curing the lens forming material, the ink is cross-linked with the lens forming material and the identification mark is transferred directly from the mold to a portion of the surfaces of the lens, of which it then forms an integral part. The identification mark contains information identifying the lens' properties such as the power of the lens. Thus, the specifications of the lens can be easily verified from the identification mark on the lens. Chances for error in labeling can be minimized because the identification mark is transferred to the lens directly from the mold that determines the lens' properties.

Because the specifications of a molded lens depend on the physical properties of the molds from which the lens is formed, each mold can be pre-measured and marked with an indication such as a mark in the form of a bar code that represents the information, or with a Radio Frequency Identification (RFID) chip comprising said information.

The bar code can for example be printed or etched onto the back surface of the mold. The back surface is the surface opposing the molding surface of the mold which is receiving the lens forming material. The bar code can be read by a scanner and then placed in ink on the molding surface of the mold so that the bar code transfers subsequently onto the cured lens. The bar code on the back surface of the mold could then be read again and reprinted on the molding surface of the mold before the mold is used to make another lens. This process can be repeated and thus is suitable for use in an automated lens-forming manufacturing process.

The RFID chip can for example be attached to or embedded into the back surface of the mold. The RFID chip can be read by a suitable transponder and the information be placed as an identification mark in ink on the molding surface of the mold so that the identification mark, and hence the information, transfers subsequently onto the cured lens. The RFID chip of the mold could then be read again and the information reprinted on the molding surface of the mold before the mold is used to make another lens. This process can be repeated and thus is suitable for use in an automated lens-forming manufacturing process.

When the identification mark is printed onto the mold, the location of the identification mark on the molding surface of the mold may be anywhere within that surface. Preferably, the identification mark is located around the periphery of the molding surface.

It is believed that for the method of the invention the surface properties of the contact lens mold, as well as the properties of the printing ink and the lens forming material are essential. In particular the relative characteristics, i.e. the solubility of ink and lens forming material, are essential for the working of the present invention.

A preferred lens mold material used in the method of the invention is made of a hydrophilic, high surface energy lens mold material, such as for example glass, with a surface tension of from 40 to 70 mN/m.

In a preferred method of the invention the ink is applied in a format representing an identification mark, wherein the identification mark is formed by a matrix of from 1×1 to 100×100 ink drops, preferably about 10×10 ink drops within an area of 1 to 2.5 mm², preferably of about 2.25 mm².

For an identification mark, the average diameter of an ink drop is 100 μm and the average minimum distance of two ink drops is 50 μm. The printing density for an identification mark preferably is about 44 ink dots per millimeter, which corresponds to about 1118 dpi (dots per inch).

In one aspect the present invention relates to a method for making a colored contact lens, comprising the steps of: (a) applying an ink to at least a portion of at least one molding surface of a lens mold, (b) dispensing a lens-forming material (103, 303) into at least one of the mold halves (102, 302) of said lens mold; (c) closing the two mold halves (101, 301; 102, 302) of the said lens mold to form a lens-forming cavity; and (d) curing the lens-forming material within the lens-forming cavity to form the contact lens, whereby the ink is transferred to the body of the contact lens, characterized in that the ink is applied as one or more ink drops (104, 304), wherein each ink drop is sufficiently flat, that the forces exerted by the mold surface to the ink drop surface in the area where they make contact, are higher than the forces exerted by the flowing lens forming material (103, 303) to the facing surface of the ink drop; and, wherein the ink material and the lens forming material are sufficiently immiscible or are not miscible at all.

In a preferred aspect the present invention relates to a method, wherein the step (a) of applying an ink to at least a portion of said at least one molding surface of said lens mold comprises ink jet printing or pad transfer printing with a suitable ink.

In another preferred aspect the present invention relates to a method, wherein the step (a) of applying an ink to at least a portion of said at least one molding surface of said lens mold comprises ink jet printing with an ink jet ink.

In still another preferred aspect the present invention relates to a method, wherein the step (a) of applying an ink to at least a portion of said at least one molding surface of said lens mold comprises ink jet printing with an ink jet ink, wherein the ink jet ink is a hydrophilic ink with a viscosity between 5 and 15 m Pa·s.

In another preferred aspect the present invention relates to a method, wherein the step (b) of dispensing a lens-forming material into said at least one of the mold halves comprises dispensing a solvent-based lens forming material into the female mold half of the said mold.

In yet another preferred aspect the present invention relates to a method, wherein the step (b) of dispensing a lens-forming material into said at least one of the mold halves comprises dispensing a solvent-based lens forming material into the female mold half of the said mold, wherein the lens forming material has a viscosity between 1 m Pa·s and 10000 m Pa·s, preferably between 5 m Pa·s and 5000 m Pa·s, more preferably between 10 m Pa·s and 1000 m Pa·s.

In yet still another preferred aspect the present invention relates to a method, wherein in the said one or more ink drops have a height of from 0.5 μm and 1 μm, when placed on the said portion of said at least one molding surface of said lens mold. In an even more preferred aspect the said one or more ink drops, when applied to the molding surface of the lens mold, have a diameter of from 50 μm to 150 μm, preferably from 80 μto 120 μm.

In a further more preferred aspect the said one or more ink drops have a volume of from 60 picoliter to 100 picoliter, preferably about 80 picoliter.

In another aspect the present invention relates to a method wherein the at least one molding surfaces of said lens mold is made of a hydrophilic, high surface energy lens mold material, such as for example glass, with a surface tension of from 40 to 70 mN/m.

In yet another aspect the present invention relates to a method, wherein the ink is applied in a format representing an identification mark. Preferably the identification mark is formed by a matrix of from 1×1 to 100×100 ink drops, more preferably about 10×10 ink drops, preferably within an area of from 1 to 2 5 mm², more preferably within an area of about 2.25 mm².

In still another aspect the present invention relates to a method for making a colored contact lens, comprising the steps of: (a) applying an ink to at least a portion of at least one molding surface of a lens mold, (b) dispensing the lens-forming material (103, 303) into at least one of the mold halves (102, 302) of said lens mold; (c) closing the two mold halves (101, 301; 102, 302) of the said lens mold to form a lens-forming cavity; and (d) curing the lens-forming material within the lens-forming cavity to form the contact lens, whereby the ink is transferred to the body of the contact lens, characterized in the ink on the mold surface is not soluble by the lens forming material on the mold surface.

EXAMPLES

A preferred ink used in the method of the invention is a PVA (Polyvinylalcohol) based ink of the following composition 7% HEMA=2-hydroxyethyl methacrylate
7% Nelfilcon polymer (a PVA based polymer) (prepared according to U.S. Pat. No. 5,583,163 or EP 790258B1)
2% Phthalocyanine green pigment
1.2% Irgacure® 2959, a photoinitiator (commercially available from Ciba AG, Basel, Switzerland)
1% Diethylenglycol
0.5% Surfynol® 465, a surfactant (commercially available from Air Products, US) 81.3% water A preferred lens forming material used in the method of the invention is a silicone hydrogel lens forming material of the following composition:

33% CE-PDMS Macromer
17% Tris-acrylamide which is N-[tris(trimethylsiloxy)-silyl-propyl]acrylamide
24% N,N-dimethylacrylamide
0.5% L-PEG 2000, which is (N-(Carbonyl-methoxypolyethylenglycol-2000)-1,2-distearoyl-sn-glycero-3-phospoethanolamine, sodium salt)
1.0% Darocur® 1173, a photoinitiator
24.5% 1-propanol CE-PDMS Macromer is a chain-extended polydimethylsiloxane vinylic macromer with terminal methacrylate groups and is prepared as below:

In the first step, α,ω-bis(2-hydroxyethoxypropyl)-polydimethylsiloxane (Mn=2000, Shin-Etsu, KF-6001a) is capped with isophorone diisocyanate by reacting 49.85 g of α,ω-bis(2-hydroxyethoxypropyl)-polydimethylsiloxane with 11.1 g isophorone diisocyanate (IPDI) in 150 g of dry methyl ethyl ketone in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry methyl ethyl ketone are added dropwise to the IPDI-PDMS-IPDI solution to which has been added an additional 0.063 g of DBTDL. The reactor is held for 4.5 h at 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

The invention claimed is:

1. A method for making a colored contact lens, comprising the steps of:
    (a) applying a water based ink to at least a portion of at least one molding surface of a lens mold,
    (b) dispensing a lens-forming silicone hydrogel material into at least one of the mold halves of said lens mold;
    (c) closing the two mold halves of the said lens mold to form a lens-forming cavity; and
    (d) curing the lens-forming material within the lens-forming cavity to form the contact lens, whereby the ink is transferred to the body of the contact lens,
    wherein the lens mold is made of a hydrophilic, high surface energy lens mold material with a surface tension of from 40 to 70 mN/m,
    wherein the ink is applied as one or more ink drops and each ink drop is sufficiently flat, that the forces exerted by the mold surface to the ink drop surface in the area where they make contact, are higher than the forces exerted by the flowing lens forming material to the facing surface of the ink drop; and, wherein the ink material and the lens forming material are sufficiently immiscible or are not miscible at all.

2. A method according to claim 1, wherein the step (a) of applying an ink to at least a portion of said at least one molding surface of said lens mold comprises ink jet printing or pad transfer printing with a suitable ink.

3. A method according to claim 1, wherein the step (a) of applying an ink to at least a portion of said at least one molding surface of said lens mold comprises ink jet printing with an ink jet ink.

4. A method according to claim 1, wherein the step (a) of applying the water based ink to at least a portion of said at least one molding surface of said lens mold comprises ink jet printing with an ink jet ink, wherein the ink jet ink is a hydrophilic ink with a viscosity between 5 and 15 m Pa·s.

5. A method according to claim 1, wherein the step (b) of dispensing a lens-forming material into said at least one of the mold halves comprises dispensing a hydrophobic lens forming material into the female mold half of the said mold, wherein the lens forming material has a viscosity between 1 m Pa·s and 10000 m Pa·s.

6. A method according to claim 1, wherein in the said one or more ink drops have a height of from 0.5 μm and 1 μm, when placed on the said portion of said at least one molding surface of said lens mold.

7. A method according to claim 1, wherein the said one or more ink drops, when applied to the molding surface of the lens mold, have a diameter of from 50 μm to 150 μm.

8. A method according to claim 1, wherein the said one or more ink drops have a volume of from 60 picoliter to 100 picoliter.

9. A method according to claim 1, wherein the ink is applied in a format representing an identification mark.

10. A method according to claim 9, wherein the identification mark is formed by a matrix of from 1×1 to 100×100 ink drops, within an area of from 1 to 2.5 mm$^2$.

11. A method according to claim 1, wherein the said lens mold is glass mold.

* * * * *